United States Patent [19]
Schmied

[11] 3,958,669
[45] May 25, 1976

[54] RESILIENTLY SUPPORTED MAGNETIC RAIL-BRAKE SUSPENSION DEVICE

[75] Inventor: Lothar Schmied, Wetter, Germany

[73] Assignee: Knorr-Bremse GmbH, Munich, Germany

[22] Filed: Dec. 20, 1974

[21] Appl. No.: 534,810

[30] Foreign Application Priority Data
Sept. 13, 1974 Germany.............................. 2443832

[52] U.S. Cl.................................. 188/165; 105/77; 267/71; 267/74; 403/117; 403/229
[51] Int. Cl.².................... B60L 7/00; B61C 15/04; F16F 1/06; F16F 1/26
[58] Field of Search................. 105/77, 78; 188/165; 267/71, 74; 403/117, 220, 229, 291

[56] References Cited
UNITED STATES PATENTS
1,866,552    7/1932    Ellis ..................................... 188/165

1,898,555    2/1933    McCune ............................... 105/77
2,570,034    10/1951   Larsen ................................. 188/165
3,516,364    6/1970    Machetert-Tassin ............. 105/77 X FOREIGN PATENTS OR APPLICATIONS
68,947    3/1958    France.................................. 105/77

Primary Examiner—Robert J. Spar
Assistant Examiner—Howard Beltran
Attorney, Agent, or Firm—Edmund M. Jaskiewicz

[57] ABSTRACT

A rail-brake magnet is suspended from structure on a railway vehicle at a predetermined distance above a rail when in its non-operating state by a spring. Abutment means are provided to limit the movement of the spring in the direction of raising the rail-brake magnet so that the spring is subjected to an initial stress when the rail-brake magnet is raised to its non-operating position. This initial stress on the spring may be adjusted.

5 Claims, 4 Drawing Figures

RESILIENTLY SUPPORTED MAGNETIC RAIL-BRAKE SUSPENSION DEVICE

The present invention relates to the suspension of a rail-brake magnet on a railway vehicle, more particularly, to a suspension device having at least one spring which supports the rail-brake magnet in its non-operating position at a distance above the rail.

Various forms of suspension devices have been provided for suspending a rail-brake magnet on a railway vehicle in its non-operating state by means of one or more tension or compression springs whose strength corresponds to the weight of the magnet. The springs support the rail-brake magnet at a predetermined position above the rail and are generally located between the rail-brake magnet and a structure supported on the frame of the vehicle or on the axle bearing of the vehicle. The railway vehicle is frequently subjected to vibrations and shocks which may be caused by the wheels of the vehicle passing over rail joints, the rails may be uneven or when passengers enter or leave the vehicle. These shocks may subject the rail-brake magnet to vertical oscillations. In the case of resonance frequencies the amplitude of vibration may become so great that the magnet may strike the rail which will not only cause disturbing and objectionable noises but may subject the rail-brake magnet to possible damage.

A suspension device of this general type has been proposed wherein the spring comprises a compression spring with its lower end surrounding an opening in the support structure and its upper end attached to a plate secured to a tie rod which passes through the spring and the opening. The lower end of the rod is pivotally connected to the rail-brake magnet and an adjustable threaded coupling is provided between the rod and the plate and/or the pivotal connection in order to adjust the distance between the rail-brake magnet when it is in its non-operating or rest position and the surface of the rail. In the case of relatively slow vehicles this distance between the rail-brake magnet and the rail is about 10 mm. so that upon being energized, the rail-brake magnet is lowered by magnetic force onto the rail upon which the vehicle is traveling. As the rail-brake magnet is lowered, the spring is slightly compressed.

In comparison with suspension devices using tension springs, the abovedescribed suspension device using a compression spring has the advantage that in the event the spring should break the rail-brake magnet does not become completely free from its support. It is readily apparent that the unfastening of a rail-brake magnet so as to fall freely among the rails could lead to serious accidents. Rather, the compression spring suspension device enables the rail-brake magnet to remain attached to the support on the railway vehicle by means of the pull rod and thus the magnet cannot drop under the wheels and cause possible derailment.

It is therefore the principal object of the present invention to provide a novel and improved suspension device for rail-brake magnets on railway vehicles.

It is another object of the present invention to provide a suspension device for rail-brake magnets utilizing springs but wherein vertical oscillations of the rail-brake magnet are avoided.

According to one aspect of the present invention a device for suspending a rail-brake magnet from a structure on a railway vehicle at a predetermined distance above a rail when in its non-operated state may comprise a spring and means for connecting the spring to the rail-brake magnet. Abutment means are provided to limit the movement of the spring in the direction of raising the rail-brake magnet so that the spring is subjected to an initial stress when the rail-brake magnet is raised to its non-operating position. Means are also provided for adjusting the initial stress on the spring in order to take into consideration the different weights and masses of rail-brake magnets while achieving in every instance the smallest possible loss of force exerted by the energized rail-brake magnet against the rail.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
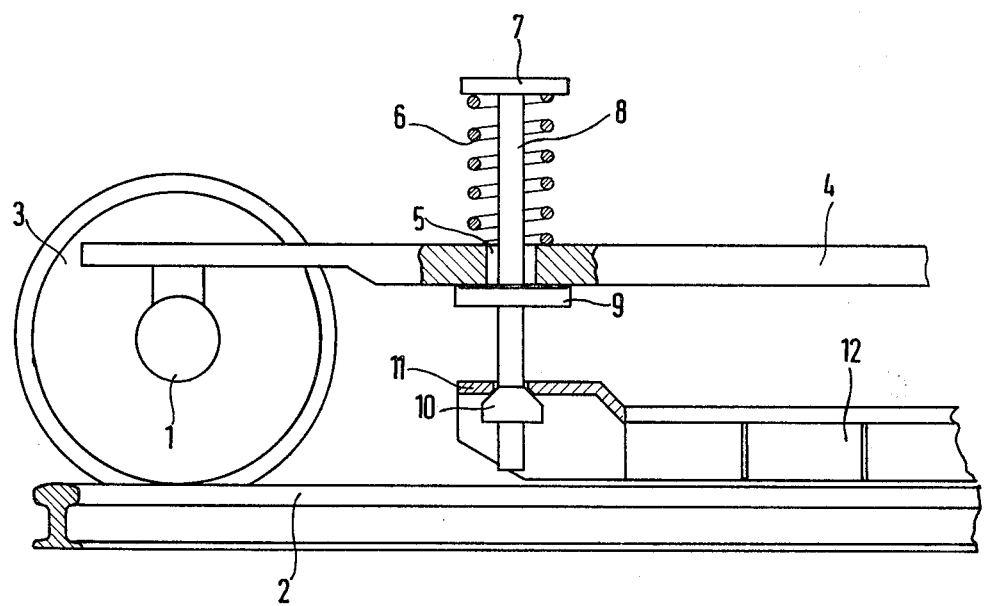
FIG. 1 is a side elevational view of a rail-brake magnet suspension device according to the present invention.

In FIG. 1 there is illustrated a portion of a railway vehicle upon which the suspension device of the present invention has been installed. There is illustrated an axle bearing 1 for supporting a wheel 3 upon a rail 2. A support member 4 rests upon the axle bearing 1 but may also comprise a beam or other structural element on the frame of the vehicle itself.

There is a vertical opening 5 in the support 4 and a compression spring 6 has its lower end resting on the support 4 so as to surround the opening 5. The spring 6 is vertically disposed and has a plate 7 on its upper end. The plate 7 is connected to a pull rod 8 that extends vertically downwardly through the compression spring 6 and opening 5. There is an abutment member 9 on the pull rod 8 below the support 4 and engageable with the underside of the support 4. The lower end of the pull rod 8 is provided with a bearing element 10. A rail-brake magnet 12 has a bearing opening 11 through which the rod 8 passes so that the portions surrounding the opening 11 rests on the bearing element 10.

While not shown in the drawings, a suspension device as described herein is located at the other end of the rail-brake magnet which also is not illustrated.

The abutment element 9 is so positioned on the pull rod 10 that it limits the movement of the spring in the direction of raising the rail-brake magnet to its inoperative position. The abutment element is thus pressed against the underside of support 4 with a force that is a fraction of the total force exerted by the compression spring 6 but which is greater than the weight of the rail-brake magnet 12. Thus, the compression spring 6 is initially stressed when the rail-brake magnet 12 is not energized and is lifted from the rail 2 by the force of compression spring 6. The bearing element 10 holds the rail-brake magnet 12 by means of the bearing eye 11 at a predetermined small distance above the surface of rail 2 which distance is about 10 mm. Any vertical shocks which may be received by the vehicle and are thus transmitted to the frame 4 will not produce a vertical oscillation of the rail-brake magnet 12 since, because of its initial stress, the compression spring 6 will prevent any downward oscillation resulting from such shocks. At the same time, the abutment element 9 in contact with the underside of support 4 will prevent any upward oscillation. A horizontal swinging of the rail-brake magnet 12 is also prevented by the frictional engagement between support 4 and abutment element 9. The friction coupling between abutment element 9 and support 4 is produced by the initial stress in compression spring 6. It is only when the vehicle is subjected to shocks or impacts of unusually high magnitude that the initial stress on compression spring 6 may be overcome for a short period of time by means of the inertia of the mass of rail-brake magnet 12. The rail-brake magnet 12 may thus be subjected to a single relatively short oscillatory movement which will avoid excessive shock stressing of the support 4, the running gear of the railway vehicle and rail 2.

When the rail-brake magnet 12 is energized, it is attracted by magnetic forces to the rail 3. As the rail-brake magnet 12 is lowered into contact with the upper surface of the rail 2 the compression spring 6 will be compressed to a corresponding extent. The abutment element 9 will be separated from the underside of support structure 4 and the rail-brake magnet 12 will be so positioned that it produces an optimal contact with rail 2. The braking forces exerted by rail-brake magnet 12 during the braking operation are transmitted from the rail-brake magnet 12 to the vehicle through customary and well-known structure which is known in the art.

When the rail-brake magnet 12 is de-energized, the compression spring 6 will again lift the magnet 12 upwardly into the position in which it is illustrated in FIG. 1.

Figure 2:
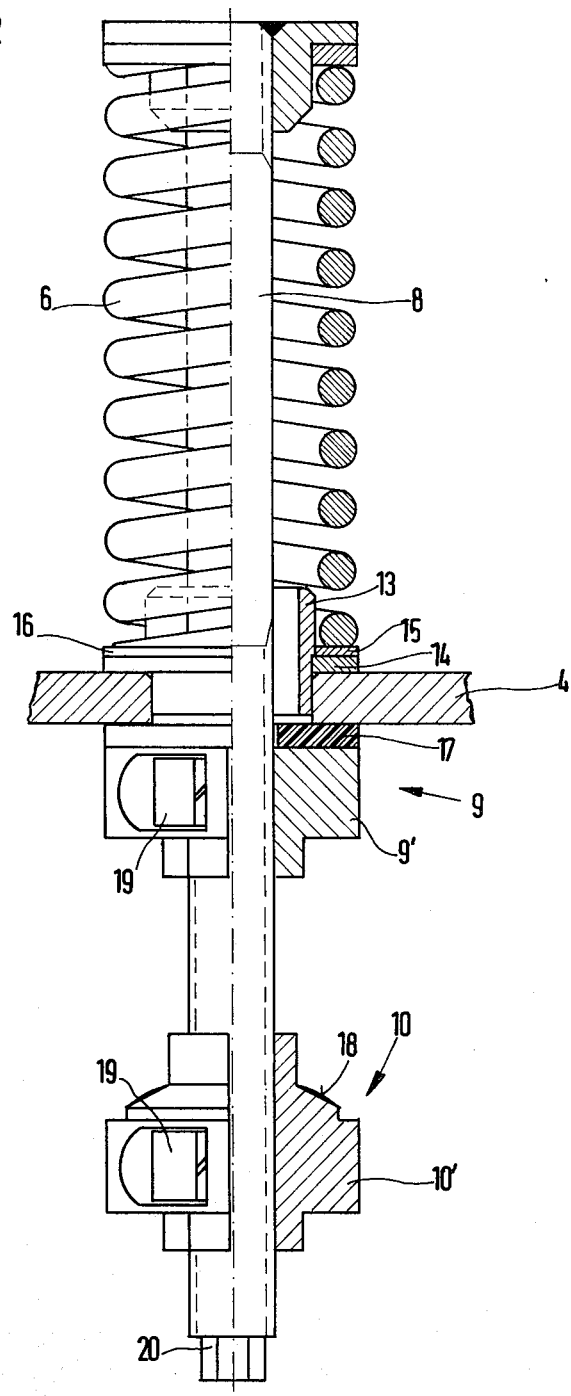
FIG. 2 is an elevational view of the suspension device per se according to the present invention but in enlarged scale as compared to that of FIG. 1 and partially in section.

In the suspension device shown in FIG. 2, a guide sleeve 13 having an external flange 15 is inserted into the opening 5 passing through the support structure 4. The flange 15 rests on an intermediate ring or washer 14 positioned upon the upper surface of support 4 so as to retain the guide sleeve 13 in position. The lower end of compression spring 6 is positioned to surround the upwardly projecting portion of guide sleeve 13 and via a plate ring 16 rests upon intermediate ring 14 and thus upon the support 4. Thus, the lower end of compression spring 6 is guided or positioned by the sleeve 13. The guide sleeve 13 is also employed for guiding the pull rod 8 which passes through the sleeve 13 with a relatively wide clearance so that the pull rod cannot knock out the opening 5 of support 4 in the event of a possible deflection of the rail-brake magnet 12.

The upper plate 7 is welded to the upper end of the pull rod 8. The rod 8 is threaded along its length which extends downwardly from the guide sleeve 13. Abutment element 9 which comprises an adjusting nut 9', and bearing element 10 which comprises a nut 10' are screwed upon this threaded portion of the rod 8. On its side directed toward support 4, adjusting nut 9' carries an annular element 17 of elastic, vibration-damping material. This material 17 provides the contact between the nut 9' and support 4 and absorbs the abutment of the nut 9' against support 4 when the rail-brake magnet 12 is lifted upon being deenergized.

The nut 10' is provided with a spherical bearing surface 18 which is in contact with the bearing eye 11 of the rail-brake magnet 12. The eye 11 may have a surrounding shape which conforms to the shape of the bearing surface 18.

Adjusting nut 9' and the nut 10' are each provided with a locking or set screw 19 that extends perpendicularly to rod 8 and locks each nut on rod 8 so as to prevent rotation of the respective nuts on the rod. The lower end of rod 8 has a hexagonal cross-section 20 or a section having a different configuration that can be engaged by a adjustable wrench or other suitable tool.

In order to adjust the height at which a rail-brake magnet 12 is suspended, the locking screws 19 in the nuts 9' and 10' are first loosened. The adjusting nut 9' is threaded downwardly on pull rod 8 at a predetermined distance from the support 4. Nut 10' is then threaded on pull rod 8 so that the non-energized rail-brake magnet 12 is in a position which is somewhat higher than its required position or a distance of about 12.5 mm. above the surface of the rail 2. During such threading, it may be desirable to hold the nut 10' firmly and to turn the pull rod 8 by means of a wrench positioned over the hexagonal end 20. Subsequently, the nut 10' is then locked in position by tightening its locking screw 19.

In order to then adjust or set the initial stress on compression spring 6, the adjusting nut 9' is turned manually until it contacts support 4. The nut 9' is then turned with a tool an additional turn in the upward direction and secured in this position by tightening its locking screw 19. In this manner, it is possible to attain an initial stress that corresponds to the pitch of the thread on pull rod 8 and to the correct height of suspension of the rail-brake magnet. For example, the pitch of thread may be about 2.5 mm. and with a rail-brake magnet weighing about 70 kp the initial stress on compression spring 6 may be about 16 kp and the rail-brake magnet be positioned at a height of 10 mm. over the rail.

Figure 3:
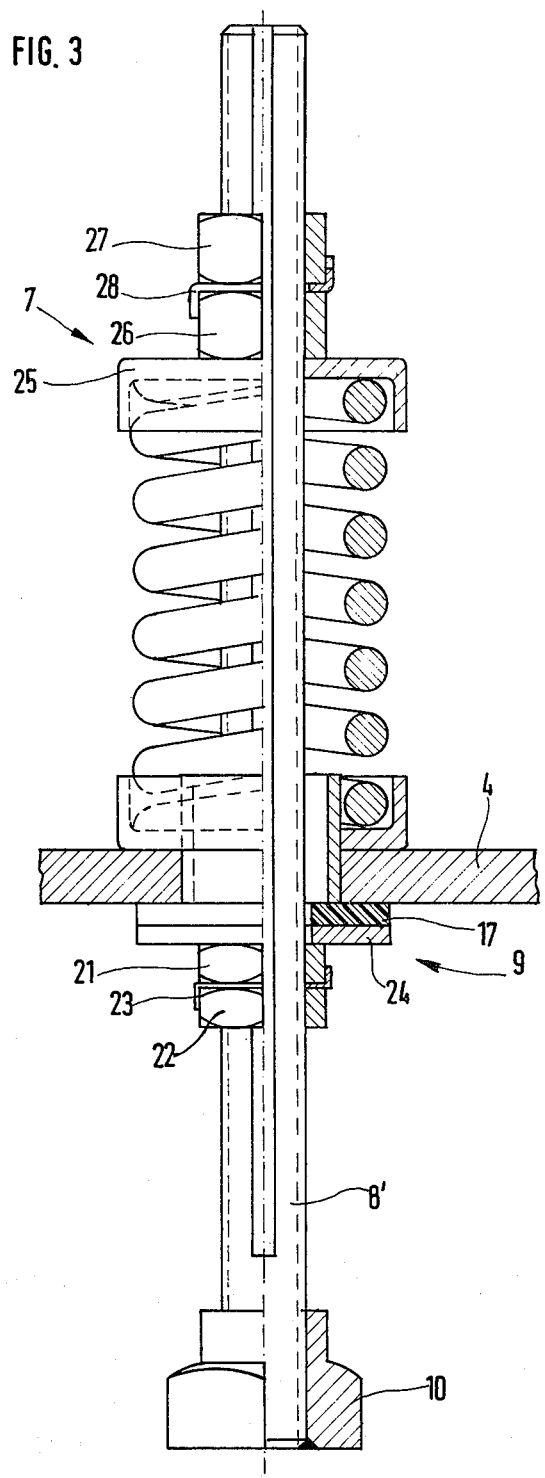
FIG. 3 is a view similar to that of FIG. 2 of a modification of the present invention.

In the device of FIG. 3, the pull rod comprises a threaded spindle shaft 8' and a hexagonal bearing element 10 welded on the lower end of the spindle shaft. The abutment element 9 comprises a nut 21, a counter nut 22 and a locking plate 23. There is also a disk or washer 24 carrying annular element 17 resting on the nut 21. The upper plate 7 comprises a cup-shape element 25 that is loosely mounted on spindle shaft 8' and is positioned on the upper end of the compression spring 6. The element 25 is supported with respect to the spindle shaft 8' by means of a nut 26, a counter nut 27 and a locking plate 28.

In order to adjust the suspension device of FIG. 3, the rail-brake magnet is set in a vertical position slightly exceeding the required height by means of the nut 26 after the nut 21 has been threaded downwardly. The required vertical position of the rail-brake magnet and at the same time the initial stress on compression spring 6 are set by threading nut 21 manually into contact with support 4 and through subsequent threading of nut 21 by a predetermined amount. The counter nuts 22 and 27 are then tightened and the nuts are secured in position by bending the locking plates 23 and 28.

Figure 4:
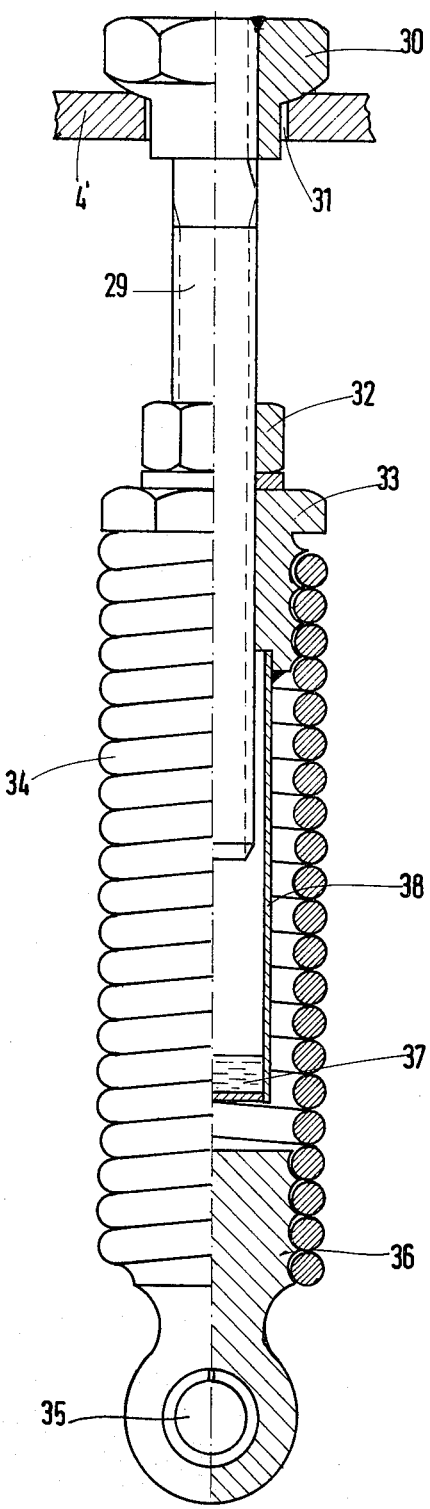
FIG. 4 is a view similar to that of FIG. 2 and showing a further modification of the present invention.

If the possible dangers accompanying the braking of a suspension spring as described above can be tolerated, the suspension device of the present invention may also be provided with a tension spring. In its basic structure, the tension spring can be wound under an initial stress on a core in such a manner that the spring will stretch only after a certain spring force has been exceeded. Such a force is preferably somewhat greater than the weight of the rail-brake magnet which will load the tension spring. However, the level of initial stress on the tension spring cannot be adjusted in this modification. Such a modification is shown in FIG. 4 wherein a pull rod 29 is suspended in a bore 31 in a support 4' by means of a spherical head 30 attached at the upper end of the rod. The pull rod 29 comprises a threaded spindle shaft on which may be threadedly adjusted a spring retaining arrangement 33 secured in position by a counter nut 32. A spring retaining structure 33 has helical or thread-like grooves in its outer surface to receive the turns on the upper end of a tension spring 34 that is wound under an initial stress or tension. A second spring retaining structure 36 having a bearing eye 35 is similarly retained at the lower end of the tension spring 34 by a threaded or helical groove arrangement. The rail-brake magnet which is not illustrated in this view is supported in the bearing eye 35. The upper spring retaining structure 33 has attached to its lower end surrounding the bore therethrough a cylinder 38 whose bottom end is closed and which is partially filled with oil 37. The cylinder 38 thus also surrounds the lower portion of the rod 29. The cylinder 38 projects into the tension spring 34 and serves to maintain the threaded coupling between pull rod 29 and spring retaining structure 33 in operating condition.

In contrast to the suspension device of FIG. 1, instead of being attached directly to axle bearings 1, support 4 in the modification of FIG. 4 may also be attached to another part of the vehicle such as the frame thereof. When a vertical control such as is known in the art is not employed in conjunction with the modified suspension device of FIG. 4, it is possible to obtain a level adjustment of the rail-brake magnet corresponding to the vertical stroke of the vehicle springs when the vehicle is loaded.

It is therefore apparent that the suspension device according to the present invention takes into consideration the different weights and masses of rail-brake magnets while obtaining in every installation the smallest posssible loss of force exerted by the energized rail-brake magnet against the rail. An adjustable initial stress is imposed upon the spring of the spring device to accomplish this object. Where the suspension device has a compression spring whose lower end is positioned on the upper surface of a support element and surrounding an opening through which a pull rod extends whose upper end is fastened to the upper end of the compression spring and whose lower end is pivotally connected to the rail-brake magnet there is provided an adjustable threaded coupling between the pull rod and the spring plate and/or the bearing element by means of which the rod is attached to the rail-brake magnet. The initial stress on the spring may be adjusted in a particularly simple manner by positioning a displaceable abutment element on the pull rod below the supporting structure such that the abutment element engages the underside of the support structure.

It will be understood that this invention is susceptible to modification in order to adapt it to different usages and conditions, and accordingly, it is desired to comprehend such modifications within this invention as may fall within the scope of appended claims.

What is claimed is:

1. A device for suspending a rail-brake magnet from a structure on a railway vehicle at a predetermined distance above a rail when in its de-energized state, said structure having a vertical opening therein, and comprising a compression spring and having a lower end surrounding said opening and an upper end, a plate on the upper end of said spring, means for connecting said spring to a rail-brake magnet and comprising a rod having an upper end connected to said plate and passing within said spring through said opening and having a lower end, a bearing block on the lower end of said connecting rod having a spherical bearing surface on the top thereof and engaging the underside of the rail brake magnet to pivotally support the rail brake magnet, and abutment means for limiting the movement of said spring in the direction of raising said rail-brake magnet to its de-energized position such that said spring is subjected to an initial stress when the rail-brake magnet is raised to its de-energized position, and an adjustable threaded coupling between said rod and one of said plate and said bearing block.

2. A device as claimed in claim 1 and comprising a guide sleeve fitted in said opening and projecting upwardly from said structure.

3. A device for suspending a rail brake magnet from structure on a railway vehicle at a predetermined distance above a rail when in its de-energized state, said structure having a vertical bore therein, and comprising a pull-rod having an upper end suspended in said bore by a head and having a threaded shaft portion, a first spring retaining member on said threaded shaft portion, a tension spring having an initial tension thereon and having an upper end retained on said first retaining member and a lower end, and a second retaining member retained in said spring lower end and having means thereon for supporting a rail brake magnet.

4. A device as claimed in claim 3 wherein said threaded shaft portion extends axially into said spring.

5. A device as claimed in claim 4 and further comprising a cylinder extending from said first retaining member into said spring and having a closed end to enclose said threaded shaft portion, said cylinder being partially filled with oil.

* * * * *